United States Patent [19]
Kikugawa et al.

[11] 3,910,883

[45] Oct. 7, 1975

[54] S-SUBSTITUTED-2-THIOADENOSINES AND PROCESS FOR PRODUCING THE SAME

[75] Inventors: Kiyomi Kikugawa; Hideo Suehiro, both of Kokubunji; Leiko Sugata, Saiki; Motonobu Ichino; Tokuro Nakamura, both of Mitaka, all of Japan

[73] Assignee: Kohjin Co., Ltd., Tokyo, Japan

[22] Filed: July 10, 1973

[21] Appl. No.: 378,117

[30] Foreign Application Priority Data
Jan. 29, 1973  Japan............................ 48-11159

[52] U.S. Cl............................. 260/211.5 R; 424/180
[51] Int. Cl.²........................................ C07H 19/16
[58] Field of Search............................ 260/211.5 R

[56] References Cited
UNITED STATES PATENTS

| | | |
|---|---|---|
| 3,380,996 | 4/1968 | Honjo et al................. 260/211.5 R |
| 3,454,559 | 7/1969 | Yamazaki et al............ 260/211.5 R |
| 3,719,660 | 3/1973 | Imai et al.................... 260/211.5 R |
| 3,752,805 | 8/1973 | Maguire et al.............. 260/211.5 R |

*Primary Examiner*—Johnnie R. Brown
*Attorney, Agent, or Firm*—Sughrue, Rothwell, Mion, Zinn & Macpeak

[57] ABSTRACT

Novel S-substituted-2-thioadenosines and a process for producing S-substituted-2-thioadenosines by reacting 2-thioadenosine with a halide represented by the general formula RX wherein R is defined hereinafter in the presence of alkali at 0° – 100°C for 30 minutes to 100 hours are disclosed. The S-substituted-2-thioadenosines are useful as a coronary vascular vasodilator and a platelet aggregation inhibitor.

13 Claims, No Drawings

S-SUBSTITUTED-2-THIOADENOSINES AND PROCESS FOR PRODUCING THE SAME

BACKGROUND OF THE INVENTION

1. Field of the Invention

The present invention relates to S-substituted-2-thioadenosines and to a process for producing the same by reacting a 2-thioadenosine with a halide represented by the general formula RX. It also relates to a coronary vascular vasodilator and blood platelet aggregation inhibitor.

2. Description of the Prior Art

Heretofore, pharmaceutical effects of S-substituted-2-thioadenosines of this type have not sufficiently been examined due to the difficulty of the production thereof though excellent pharmaceutical effects are expected. In addition, as the process for producing the S-substituted-2-thioadenosine compounds, there is known a process of condensing 2-methyl or ethylthioadenosine or 2-iso-propyl or n-propylthio-6-chloropurine and ribose (M. H. Maguire et al, "Journal of Medicinal Chemistry," Vol. 14, page 415, 1971) or a process of reacting 2-chloroadenosine with a methyl, ethyl, n-propyl or iso-propyl mercaptan (ibid.; and H. J. Schaeffer & H. J. Thomas, "Journal of the American Chemical Society," Vol. 80, page 3738, 1958). However, these processes involve a number of steps and are too complicated to be practical for producing these compounds. In the latter process, it is difficult to obtain a corresponding mercaptan, and these compounds having lower alkyl do not exhibit a sufficient aggregation inhibitory activity on blood platelets.

SUMMARY OF THE INVENTION

The object of the present invention is to provide novel S-substituted-2-thioadenosines useful as a coronary vascular vasodilator and platelet aggregation inhibitor.

Another object of the present invention is to provide a process for producing novel S-substituted-2-thioadenosines by reacting 2-thioadenosine with a halide represented by the general formula RX.

DETAILED DESCRIPTION OF THE INVENTION

S-Substituted-2-thioadenosines in accordance with the present invention are represented by the following general formula;

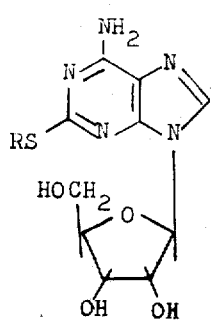

wherein R represents an alkyl group having five or more carbon atoms, a cycloalkyl group having five or more carbon atoms or a cycloalkylalkyl group having five or more carbon atoms.

As the alkyl group having five or more carbon atoms, there are illustrated a n-amyl group, an iso-amyl group, a n-hexyl group, a n-heptyl group, a n-octyl group, a n-nonyl group, a n-decyl group, a 2-ethylhexyl group, and the like. As the cycloalkyl group having five or more carbon atoms, there are a cyclopentyl group, a cyclohexyl group, a cycloheptyl group, and the like. As the cycloalkylalkyl group having five or more carbon atoms, there are a cyclohexylmethyl group, and the like.

S-Substituted-2-thioadenosines of the present invention can be obtained by reacting 2-thioadenosine represented by the following structural formula:

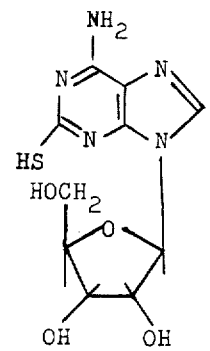

with a halide represented by the general formula;

RX wherein R is as defined above, in the presence of an alkali.

The halides advantageously used in the invention include n-amyl bromide, isoamyl bromide, n-hexyl bromide, n-octyl bromide, n-nonyl bromide, n-decyl bromide, n-heptyl bromide, cyclopentyl chloride, cyclohexyl bromide, cyclohexylmethyl bromide, 2-ethyl-n-hexyl bromide, etc.

In carrying out the process of the present invention, 2-thioadenosine is reacted with a halide at a temperature in the range of from 0° to 100°C in water or an organic solvent in the presence of an alkali.

As the reaction solvent, any solvent may be used as long as it dissolves both 2-thioadenosine and the halide and does not react with the starting materials nor the resulting product. For example, water or an alcohol can be used.

The alkali which can be used in the present invention include an alkali metals, an alkali metal hydroxide (e.g., sodium hydroxide, potassium hydroxide, etc.) and organic amines (e.g., pyridine, triethylamine, etc.).

The halide is used in an amount of from an equimolar amount to a ten-fold molar excess amount based on 2-thioadenosine. The alkali is used in an amount of from an equimolar amount to a ten-fold molar excess amount based on 2-thioadenosine, but an equimolar amount is preferred.

The reaction is conducted at a temperature in the range of from 0° to 100°C for a period of from 30 minutes to 100 hours. The reaction product is usually obtained as a precipitate from the reaction mixture. If no precipitate is formed, the product may be separated and purified with ease according to a commonly practiced procedure such as column chromatography, paper chromatography, and the like, or else, the product may be obtained as a crystalline material by neutralizing and concentrating the reaction mixture and treating it with a suitable solvent.

The process of the invention is excellent in that the desired product can be obtained by simple procedures in good yield.

The starting 2-thioadenosine can be prepared, for example, by reacting 2-chloroadenosine with an alkali metal salt of $H_2S$ as described in Japanese Patent Application 86773/71.

2-Thioadenosines of the present invention are useful as a coronary vasodilator and an aggregation inhibitor for blood platelets and, as to the pharmacological activities, reference can be made to the following literatures: M. H. Maguire et al, "Journal of Medicinal Chemistry," Vol. 14, page 415, 1971, J. A. Argus et al, "British Journal of Pharmacology," Vol. 41, page 592, 1971, R. Einstein et al, "European Journal of Pharmacology," Vol. 19, page 246, 1972, G. V. R. Born et al, "Nature," Vol. 205, page 678, 1965, F. Michael et al, "Nature," Vol. 222, page 1073, 1969, and M. A. Packham et al, "American Journal of Physiology," Vol. 223, page 419, 1972.

The present invention will now be described in greater detail by the following examples of preferred embodiments of the invention, but they are not to be construed as limiting the scope of this invention.

REFERENCE EXAMPLE 1

2.0 g of 2-chloroadenosine was dissolved in a solution of 20 ml of anhydrous hydrogen sulfide and 1.5 g of sodium metal in 80 ml of dimethylformamide followed by reacting under anhydrous condition at a temperature of 80°C for 5 hours. The resulting reaction mixture was diluted with 80 ml of water, and made neutral with acetic acid. The mixture was then concentrated and dissolved in 75 ml of a mixture of n-butanol and water (2:1), and 25 ml of acetic acid was added thereto. The crystals formed upon allowing to stand were filtered to obtain 2.1 g (100% yield) of 2-thioadenosine. A pure product was obtained by dissolving the above 2-thioadenosine product in diluted aqueous ammonia and adjusting the pH of the solution with acetic acid to 4.

Melting Point: 196 – 199°C (with decomposition)
UV: $\lambda$max (pH 1)   238.5 m$\mu$   ($\epsilon$:13800)
                       293     m$\mu$   ($\epsilon$:18400)
    $\lambda$max (pH 3.2) 239   m$\mu$   ($\epsilon$:19300)
    $\lambda$max (pH 13)  243   m$\mu$   ($\epsilon$:19100)
                        283    m$\mu$   ($\epsilon$:14000)
    $\lambda$min (pH 1)  220.5  m$\mu$   ($\epsilon$: 9400)
                        256.5   m$\mu$   ($\epsilon$: 2800)
    $\lambda$min (pH 3.2) 251.5 m$\mu$   ($\epsilon$: 3100)
    $\lambda$min (pH 13)  227   m$\mu$   ($\epsilon$:12500)
                         259   m$\mu$   ($\epsilon$: 7100)
pKa: 7.8
Specific rotation: $[\alpha]_D^{25°}$ = –43.6° (c:0.5, dimethyl formamide)
Elementary Analysis:
Calcd. for $C_{10}H_{13}O_4N_5S \cdot H_2O$:
    C, 37.89; H, 4.77; N, 22.09; S, 10.12%
Found:   C, 37.67; H, 4.88; N, 21.82; S, 10.22%

The nuclear magnetic resonance spectrum of the product was fully consistent with its structure.

EXAMPLE 1

2-(n-Amylthio)adenosine 200 mg (0.63 m mole) of 2-thioadenosine was dissolved in 8 ml of water containing 2.1 m moles of sodium hydroxide, and 952 mg (6.3 m moles) of n-amyl bromide was added thereto. The mixture was then stirred for 4 days at 25°C to react. The precipitate formed was filtered and recrystallized from water to give 211.5 mg (91% yield) of the desired product having a melting point of 179° – 181°C.

UV: $\lambda$ max (pH 1)    272 m$\mu$
    $\lambda$ max (pH 7)    237 m$\mu$,   278 m$\mu$
    $\lambda$ max (pH 13)   236 m$\mu$,   279 m$\mu$
Elementary Analysis:
Calcd. for $C_{15}H_{23}O_4N_5S$:   C, 48.76; H, 6.27; N, 18.95%
Found:                              C, 48.65; H, 6.21; N, 19.08%

EXAMPLE 2

2-(iso-Amylthio)adenosine 200 mg (0.63 m mole) of 2-thioadenosine was dissolved in a mixture of 8.1 ml of water and 18 ml of ethanol containing 2.1 m moles of sodium hydroxide, and 952 mg (6.3 moles) of isoamyl bromide was added thereto. The mixture was then stirred for 2 days at room temperature. After neutralizing the reaction solution with HCl followed by concentration, the concentrate was washed with petroleum ether and crystallized from ethanol-water. Recrystallization from ethanol-water yield 174 mg (73% yield) of the desired product having a melting point of 125.5° – 127.5°C.

UV: $\lambda$ max (pH 1)    273 m$\mu$
    $\lambda$ max (pH 7)    237 m$\mu$,   278 m$\mu$
    $\lambda$ max (pH 13)   237 m$\mu$,   279 m$\mu$
Elementary Analysis:
Calcd. for $C_{15}H_{21}O_4N_5S \cdot \frac{1}{4}EtOH$:
    C, 49.11; H, 5.99; N, 18.49%
Found:   C, 49.02; H, 6.26; N, 18.59%

EXAMPLE 3

2-(n-Hexylthio)adenosine 200 mg (0.63 m mole) of 2-thioadenosine was dissolved in a mixture of 8.1 ml of water and 16 ml of ethanol containing 2.1 m moles of sodium hydroxide, and 1040 mg (6.3 m moles) of n-hexyl bromide was added thereto. The mixture was then stirred overnight at 25°C to react. The reaction solution was neutralized with hydrochloric acid and concentrated. The resulting concentrate was washed with petroleum ether and crystallized from ethanol-water Recrystallization from ethanol-water (10:170) yielded 99 mg (83% yield) of the desired product having a melting point of 166° – 169°C.

UV: $\lambda$max (pH 1)    273 m$\mu$
    $\lambda$max (pH 7)    237 m$\mu$,   278 m$\mu$
    $\lambda$max (pH 13)   237 m$\mu$,   279 m$\mu$
Elementary Analysis:
Calcd. for $C_{16}H_{25}O_4N_5S$:   C, 50.11; H, 6.57; N, 18.26%
Found:                              C, 50.25; H, 6.42; N, 17.79%

EXAMPLE 4
2-(n-Heptylthio)adenosine 200 mg (0.63 m mole) of 2-thioadenosine was dissolved in a mixture of 8.1 ml of water and 25 ml of ethanol containing 2.1 m moles of sodium hydroxide, and 1128 mg (6.3 m moles) of n-heptyl bromide was added thereto. The mixture was then reacted overnight at 25°C. The reaction solution was neutralized with HCl. After concentration, the concentrate was washed with petroleum ether and crystallized from ethanol-water. Recrystallization from ethanol-water yielded 134 mg (54% yield) of the desired product having a melting point of 155° – 157.5°C.

| UV: | λmax (pH 1) | 272 mμ | |
| --- | --- | --- | --- |
| | λmax (pH 7) | 237 mμ, | 278 mμ |
| | λmax (pH 13) | 237 mμ, | 279 mμ |
| Elementary Analysis: | | | |
| Calcd. for $C_{17}H_{27}O_4N_5S$: | | C, 51.37; H, 6.85; N, 17.62% | |
| Found: | | C, 51.86; H, 6.87; N, 17.24% | |

EXAMPLE 5
2-(n-Octylthio)adenosine 200 mg (0.63 m mole) of 2-thioadenosine was dissolved in a mixture of 8.1 ml of water and 30 ml of ethanol containing 2.1 m moles of sodium hydroxide, and 1217 mg (6.3 m moles) of n-octyl bromide was added thereto. The mixture was then reacted overnight at 25°C. The reaction solution was concentrated and the concentrate was washed with petroleum ether. The residue was crystallized from ethanol-water. Recrystallization from ethanol-water yielded 206.5 mg (80% yield) of the desired product having a melting point of 155° – 158°C.

| UV: | λmax (pH 1) | 272 mμ | |
| --- | --- | --- | --- |
| | λmax (pH 7) | 237 mμ, | 278mμ |
| | λmax (pH 13) | 237 mμ, | 279 mμ |
| Elementary Analysis: | | | |
| Calcd. for $C_{18}H_{29}O_4N_5S$: | | C, 52.53; H, 7.10; N, 17.02% | |
| Found: | | C, 52.87; H, 7.10; N, 16.62% | |

EXAMPLE 6
2-(n-Nonylthio)adenosine 200 mg (0.63 m mole) of 2-thioadenosine was dissolved in a mixture of 8.1 ml of water and 40 ml of ethanol containing 2.1 m moles of sodium hydroxide, and 1,305 mg (6.3 m moles) of n-nonyl bromide was added thereto. The resulting homogeneous solution was reacted for 2 days at 25°C and the reaction solution was concentrated to dryness, washed with petroleum ether, and crystallized from ethanol-water. Recrystallization from ethanol-water yielded 250.5 mg (93% yield) of the desired product having a melting point of 146° – 151°C.

| UV: | λ max (pH 1) | 272 mμ | |
| --- | --- | --- | --- |
| | λ max (pH 7) | 237 mμ, | 278 mμ |
| | λ max (pH 13) | 237 mμ, | 279 mμ |
| Elementary Analysis: | | | |
| Calcd. for $C_{19}H_{31}O_4N_5S$: | | C, 53.63; H, 7.34; N, 16.46% | |
| Found: | | C, 54.04; H, 7.28; N, 16.04% | |

EXAMPLE 7
2-(n-Decylthio)adenosine 200 mg (0.63 m mole) of 2-thioadenosine was dissolved in a mixture of 8.1 ml of water and 50 ml of ethanol containing 2.1 m moles of sodium hydroxide, and 1394 mg (6.3 m moles) of n-decyl bromide was added thereto. The mixture was then reacted for 2 days at 25°C. After concentration, the concentrate was washed with petroleum ether and crystallized from ethanol-water. Recrystallization from ethanol-water yielded 247.8 mg (89.5% in yield) of the desired product having a melting point of 145° – 150°C.

| UV: | λmax (pH 1) | 273 mμ | |
| --- | --- | --- | --- |
| | λmax (pH 7) | 237 mμ, | 278 mμ |
| | λmax (pH 13) | 236 mμ, | 279 mμ |
| Elementary Analysis: | | | |
| Calcd. for $C_{20}H_{33}O_4N_5S$: | | C, 54.65; H, 7.57; N, 15.93% | |
| Found: | | C, 54.85; H, 7.68; N, 16.06% | |

EXAMPLE 8
2-(Cyclopentylthio)adenosine 200 mg (0.63 m mole) of 2-thioadenosine was dissolved in 8.1 ml of water containing 2.1 m moles of sodium hydroxide, and 659 mg (6.3 m moles) of cyclopentyl chloride was added thereto. The mixture was then stirred for 4 days at 25°C to react. The precipitate formed was filtered, and recrystallized from ethanol to obtain 185 mg (80% yield) of the desired product having a melting point of 223° – 224.5°C.

| UV: | λmax (pH 1) | 273 mμ | |
| --- | --- | --- | --- |
| | λmax (pH 7) | 237 mμ, | 278 mμ |
| | λmax (pH 13) | 236 mμ, | 279 mμ |
| Elementary Analysis: | | | |
| Calcd. for $C_{15}H_{21}O_4N_5S$: | | C, 49.03; H, 5.76; N, 19.06% | |
| Found: | | C, 48.79; H, 5.72; N, 19.15% | |

EXAMPLE 9
2-(Cyclohexylthio)adenosine 200 mg (0.63 m mole) of 2-thioadenosine was dissolved in a mixture of 8.1 ml of water and 20 ml of ethanol containing 2.1 m moles of sodium hydroxide, and 1027 mg (6.3 m moles) of cyclohexyl bromide was added thereto and reacted for 2 days at 50°C. After concentration to dryness, the residue was washed with petroleum ether and crystallized from ethanol. Recrystallization from ethanol-water yielded 99.4 mg (41.4% yield) of the desired product having a melting point of 225° – 227.5°C.

| UV: | λmax (pH 1) | 273 mμ | |
| --- | --- | --- | --- |
| | λmax (pH 7) | 237 mμ, | 278 mμ |
| | λmax (pH 13) | 236 mμ, | 279 mμ |
| Elementary Analysis: | | | |
| Calcd. for $C_{16}H_{23}O_4N_5S \cdot \frac{1}{4}H_2O$: | | C, 49.79; H, 6.14; N, 18.15% | |
| Found: | | C, 49.73; H, 5.97; N, 18.19% | |

EXAMPLE 10

2-(Cyclohexylmethylthio)adenosine 200 mg (0.63 m mole) of 2-thioadenosine was dissolved in 8.1 ml of water containing 2.1 m moles of sodium hydroxide, and 1116 mg (6.3 m moles) of cyclohexylmethyl bromide was added thereto and stirred for 4 days at 25°C to react. The precipitate formed was filtered and recrystallized from water-ethanol to give 178 mg (71% yield) of the desired product having a melting point of 226.5° – 228.5°C.

| UV: | $\lambda$max (pH 1) | 273 m$\mu$ | |
|---|---|---|---|
| | $\lambda$max (pH 7) | 237 m$\mu$, | 278 m$\mu$ |
| | $\lambda$max (pH 13) | 236 m$\mu$, | 279 m$\mu$ |
| Elementary Analysis: | | | |
| Calcd. for $C_{17}H_{25}O_4N_5S$: | | C, 51.62; H, 6.37; N, 17.70% | |
| Found: | | C, 51.71; H, 6.34; N, 17.81% | |

EXAMPLE 11

2-(2-Ethyl-n-hexyl)thioadenosine 200 mg (0.63 m mole) of 2-thioadenosine was dissolved in 8.1 ml (2.1 m moles) of 0.25 N NaOH, and 1,217 mg (6.3 m moles) of 2-ethyl-n-hexyl bromide was added thereto. Furthermore, 30 ml of ethanol was added thereto and reacted overnight at room temperature. After concentration, the concentrate was washed with petroleum ether and crystallized from ethanol-water. Recrystallization from ethanol-water yielded 150 mg (58% yield) of the product having a melting point of 151.5° – 153.5°C.

| UV: | $\lambda$max (pH 1) | 272 m$\mu$ | |
|---|---|---|---|
| | $\lambda$max (pH 7) | 235 m$\mu$, | 278 m$\mu$ |
| | $\lambda$max (pH 13) | 234 m$\mu$, | 278 m$\mu$ |
| Elementary Analysis: | | | |
| Calcd. for $C_{18}H_{29}O_4N_5S$: | | C, 52.83; H, 7.10; N, 17.02% | |
| Found: | | C, 52.71; H, 7.23; N, 17.23% | |

The S-substituted-2-thioadenosines of the invention showed 30 – 100% inhibition of adenosine-5′-diphosphate ($10^{-5}$M)-induced aggregation or of collagen-induced aggregation of blood platelets suspension of rabbit and human (as determined according to the method of Born and Cross described in "Journal of Physiology," Vol. 168, page 178, 1963) at a level of $10^{-4}$M as shown in Table below.

| Compound | Inhibition of Rabbit Platelet Aggregation by S-Substituted-2-thioadenosines | | | |
|---|---|---|---|---|
| | Inhibition of ADR-Induced Aggregation | | Inhibition of Collagen Induced Aggregation | |
| | $10^{-4}$ M | $10^{-5}$ M | $10^{-4}$ M | $10^{-5}$ M |
| 2-n-Amylthioadenosine | 78% | 34% | 89% | 14% |
| 2-i-Amylthioadenosine | 70 | 38 | 98 | 0 |
| 2-n-Hexylthioadenosine | 80 | 7 | 94 | 20 |
| 2-n-Heptylthioadenosine | 80 | 0 | 94 | 15 |
| 2-n-Octylthioadenosine | 67 | 11 | 93 | 20 |
| 2-n-Nonylthioadenosine | 37 | 0 | 91 | 15 |
| 2-n-Decylthioadenosine | 35 | 0 | 86 | 9 |
| 2-(2-Ethyl-n-hexyl)thioadenosine | 90 | 51 | 92 | 78 |
| 2-Cyclopentylthioadenosine | 100 | 67 | 90 | 55 |
| 2-Cyclohexylthioadenosine | 100 | 79 | 93 | 87 |
| 2-Cyclohexylmethylthioadenosine | 99 | 17 | 96 | 56 |

While the invention has been described in detail and with reference to specific embodiments thereof, it will be apparent to one skilled in the art that various changes and modifications can be made therein without departing from the spirit and scope thereof.

What is claimed is:

1. S-substituted-2-thioadenosines represented by the following general formula:

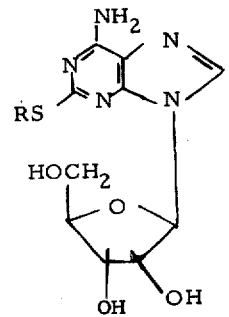

wherein R is selected from the group consisting of an alkyl group having five to 10 carbon atoms, a cycloalkyl group having five to 7 carbon atoms and a cyclohexylmethyl group.

2. S-Substituted-2-thioadenosines as described in claim 1 wherein said alkyl group is selected from the group consisting of n-amyl, iso-amyl, n-hexyl, n-heptyl, n-octyl, n-nonyl, n-decyl and 2-ethylhexyl, and said cycloalkyl group is selected from the group consisting of cyclopentyl, cyclohexyl and cycloheptyl.

3. 2-n-Amylthioadenosine of claim 1.
4. 2-iso-Amylthioadenosine of claim 1.
5. 2-n-Hexylthioadenosine of claim 1.
6. 2-n-Heptylthioadenosine of claim 1.
7. 2-n-Octylthioadenosine of claim 1.
8. 2-n-Nonylthioadenosine of claim 1.
9. 2-n-Decylthioadenosine of claim 1.
10. 2-(2-Ethyl-n-hexyl)thioadenosine of claim 1.
11. 2-Cyclopentylthioadenosine of claim 1.
12. 2-Cyclohexylthioadenosine of claim 1.
13. 2-Cyclohexylmethylthioadenosine of claim 1.

* * * * *